March 22, 1960  E. COUSINS  2,929,427
ANTI-SKID TIRE
Filed July 19, 1955

*INVENTOR.*
EDWARD COUSINS
BY
ATTORNEY

United States Patent Office 2,929,427
Patented Mar. 22, 1960

2,929,427
ANTI-SKID TIRE

Edward Cousins, Akron, Ohio, assignor to The Goodyear Tire & Rubber Company, Akron, Ohio, a corporation of Ohio Application July 19, 1955, Serial No. 522,967

2 Claims. (Cl. 152—211)

This invention relates to improvements in non-skid rubber traction members, and more particularly but not exclusively to vehicle tires.

It has long been recognized that there is a definite need for traction members, particularly automobile tires, which are constructed to provide adequate traction on icy road surfaces or during other conditions where conventional tires fail to grip the road surface. Various types of tire constructions have been proposed some of which have elongated wire coils, wire mesh, or isolated individual traction elements incorporated into the rubber of the tread surface. Each of these traction elements or inserts have contributed to increased traction but each has disadvantages which makes the use thereof unfeasible. For example, wire coils require a certain "wearing in" period prior to the peak road gripping efficiency, and in addition, after the coil has been worn the remaining U-shaped members tend to work out of the tread so that the anti-skid feature of the insert is lost. Wire mesh is a satisfactory anti-skid insert but it is particularly difficult to disperse the mesh uniformly throughout the depth of the tread. Obviously, individually spaced or isolated inserts require a considerable amount of labor to be incorporated into the tread.

It is an object of this invention to provide an improved non-skid tire construction having inserts therein which provide a large number of continuous traction augmenting edges at the tread surface and which has substantially the same road-gripping qualities during the entire useful life thereof.

A further object of this invention is to provide a non-skid tire construction in which the traction augmenting members or inserts may be economically embedded in a tire tread during manufacture of the tire or during re-capping of a used tire.

A further object of the invention is to provide a non-skid tire construction in which the traction augmenting inserts are made of hard, thin sheet material, which sheets are bonded together to form a multi-cell honeycomb structure having great compressive strength parallel to the axis of the cells or normal to the tread surface of the tire and sufficient flexibility to be incorporated into the tread during the molding operation.

Referring to the drawings, Fig. 1 is an isometric view of a tire with parts broken away showing the preferred traction augmenting insert of the present invention embedded in the tread.

Figure 1:
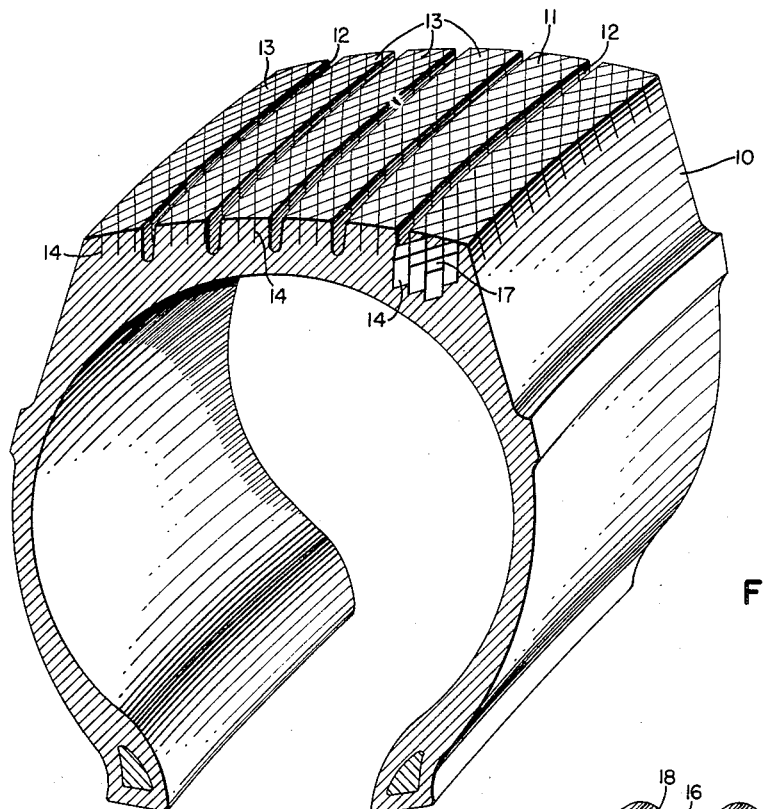

Referring to the drawings, the numeral 10 indicates a tire having a tread 11 which for the purpose of illustrating the invention is provided with a plurality of circumferentially extending grooves 12 forming intervening ribs 13.

It is to be understood that the invention is applicable to a tire having any tread design as well as other articles having traction surfaces such as conveyor belts, shoes, mats and the like. A traction augmenting insert 14 is embedded in each of the ribs 13 and is substantially the same thickness and width as the rib.

Figure 2:
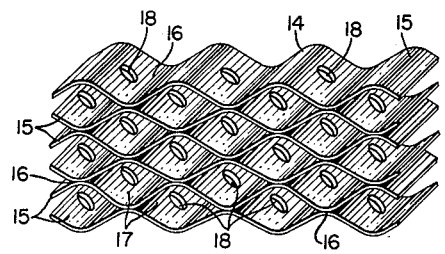
Fig. 2 is a fragmentary perspective view of the traction augmenting insert shown in Fig. 1.
Figure 3:
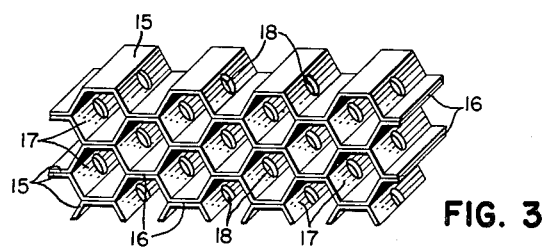
Fig. 3 is a fragmentary perspective view of a modification of the traction augmenting insert shown in Fig. 1.
Figure 4:
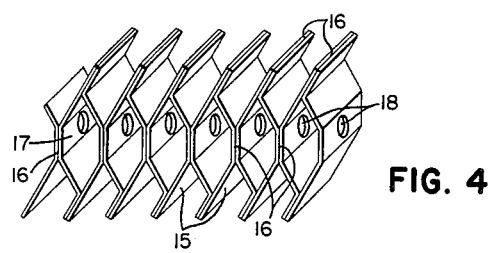
Fig. 4 is a fragmentary perspective view of a further modification of the traction augmenting insert shown in Fig. 1.

As shown in Fig. 2 the insert 14 is a multi-celled honeycomb structure made of a plurality of sheets or strips 15 composed of thin hard material. The strips 15 are corrugated transversely of their length and are arranged in staggered relation with the high and low points of adjacent strips 15 in contact and bonded together at 16 to form substantially oval shaped open ended spaces or cells 17. The areas of contact 16 between the adjacent strips, as well as the axis of each of the cells 17, are parallel and extend in the same direction as the corrugations, namely in a direction transversely of the length of the strips and substantially normal to the tread surface 11. For the purposes of this invention it is immaterial that the strips 15 be corrugated in the sinuous fashion shown in Fig. 2, so long as the areas of contact 16 and the axis of the cells are parallel and extend in a direction substantially transversely of the length of the sheets. In Fig. 3 the strips 15 are corrugated so as to form hexagonally-shaped cells 17. In Fig. 4 the individual strips 15 of material extend transversely of the length of the insert but the strips 15 are corrugated and bonded at the several areas 16 in a direction transversely of the length of the strip so that the axis of the cells 17 extend in a direction transversely of the strips.

It is, of course, essential to this invention that the traction augmenting insert be adhered to the tread rubber so that it will be retained therein during the life of the tire. The adhesion between the inserts and the tread rubber may be increased by coating the inserts with a suitable bonding agent, such as plasticized phenol formaldehyde, isocyanate resins, chlorinated rubber, or other well known adhesives for bonding materials to rubber. In addition, the adhesion of the traction augmenting insert to the tread rubber may be further supplemented by mechanically locking the insert within the tread. The individual sheet material may be pierced at spaced intervals so that at least one sidewall of each cell is provided with a perforation 18 which permits rubber to flow from cell to cell during the curing operation and provides a positive mechanical bond between the insert and the tread to thereby prevent the insert from working radially out of the tread.

The traction augmenting insert of this invention exhibits great compressive strength in directions axially of the corrugations or the cells even though the strips are thin and individually very flexible. The spaced bonds between adjacent strips and the spacing betwen the strips intervening the bonds provide the inserts of this invention with the unique and desirable properties of high compressive strength and high flexibility as well as providing a continuous network of edges which extend in several directions and terminate in the same plane.

The sheet material is preferably made of relatively thin, non-corrosive metal such as aluminum, brass, copper, and the like, but resinous materials reinforced with textile, glass, or wire fabric may also be used. The resinous material is preferably a thermosetting resin which is relatively hard, inelastic, and insoluble in water. Such resins are well known, for example, phenolic resins, urea formaldehyde, melamine formaldehyde, polyester resins, and the like.

The strips of material of a thickness of approximately 1 to 40 thousandths of an inch may be bonded together as described above by means of various well known adhesives, including the above resins, or by fusing, welding, brazing or the like.

The inserts are embedded into the tread during the curing operation of new green tires or the curing or retreading operation of camelback on used tires. The inserts of a width and thickness described above, and a circumferential length approximately equal to the circumference of the tread, are placed within the tire curing matrix with the cells normal to the tread-forming portion thereof. The insert has sufficient flexibility to be formed into an arc or circle having a radius of curvature less than the standard size of passenger and truck tires. Furthermore, as the curing mold is closed the inserts have sufficient compressive strength to maintain their position normal to the tread-forming portion of the matrix while the tread rubber of the green tire or camelback is being forced radially into the cells thereof.

Although this invention has been described and illustrated by a tire having a plurality of circumferentially extending ribs, it is to be understood that the invention is not to be so limited and is applicable to a tire having a smooth tread surface with one or more inserts embedded therein, or to a tire having any conventional tread design including projections spaced circumferentially and/or transversely of the tread surface.

While certain representative embodiments and details have been shown for the purpose of illustrating the invention, it will be apparent to those skilled in this art that various changes and modifications may be made therein without departing from the spirit or scope of the invention.

I claim:

1. A pneumatic tire having improved traction on ice comprising a rubber tread portion formed integrally with said tire having a plurality of grooves forming intervening ribs, said ribs having an elongated anti-skid insert embedded therein, said inserts made of thin, flexible sheets of metal which are individually flexible, said sheets being corrugated transversely and bonded to adjacent sheets at spaced intervals along transverse lines of contact to form a multi-celled, honeycomb structure in which the bonded areas of said sheets and the axis of the cells extend substantially perpendicular to the tread surface, said inserts being flexible whereby the insert can be formed into an arc having a radius of curvature less than that of the tire tread, said inserts being coated with an adhesive to secure the inserts to the rubber of said tread, said inserts having a width and depth substantially the same as the width and depth of said ribs, one edge of each of said sheets terminating in the plane of the surface of the ribs to form a continuous network of edges extending both circumferentially and transversely of said ribs.

2. A pneumatic tire having improved traction on ice comprising a rubber tread portion formed integrally with said tire having a plurality of grooves forming intervening ribs, said ribs having an elongated anti-skid insert embedded therein, said inserts made of thin, flexible sheets of metal which are individually flexible, said sheets extending transversely of the length of the insert, each sheet being corrugated transversely of the sheet and bonded to adjacent sheets at spaced intervals along transverse lines of contact to form a multi-celled, honeycomb structure in which the bonded areas of said sheets and the axis of the cells extend substantially perpendicular to the tread surface, said insert being flexible whereby the insert can be formed into an arc having a radius of curvature less than that of the tire tread, said inserts being coated with an adhesive to secure the inserts to the rubber of said tread, said inserts having a width and depth substantially the same as the width and depth of said ribs, one edge of each of said sheets terminating in the plane of the surface of the ribs to form a continuous network of edges extending both circumferentially and transversely of said ribs.

References Cited in the file of this patent

UNITED STATES PATENTS

| Number | Name | Date |
|---|---|---|
| 1,974,279 | Jones | Sept. 18, 1934 |
| 2,078,910 | Merrill | Apr. 27, 1937 |
| 2,121,956 | Eger | June 28, 1938 |
| 2,600,506 | Kimes | June 17, 1952 |
| 2,654,686 | Hansen | Oct. 6, 1953 |